(12) United States Patent
Xi et al.

(10) Patent No.: US 11,579,481 B2
(45) Date of Patent: Feb. 14, 2023

(54) DISPLAY PANEL AND DISPLAY DEVICE

(71) Applicant: JRD COMMUNICATION (SHENZHEN) LTD., Shenzhen (CN)

(72) Inventors: Yafang Xi, Shenzhen (CN); Ke Lin, Shenzhen (CN); Zhuwei Qiu, Shenzhen (CN); Jitao Ma, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 0 days.

(21) Appl. No.: 17/203,787

(22) Filed: Mar. 17, 2021

(65) Prior Publication Data

US 2022/0252928 A1    Aug. 11, 2022

(30) Foreign Application Priority Data

Feb. 8, 2021    (CN) .......................... 202110180234.9

(51) Int. Cl.
| | | |
|---|---|---|
| *G02F 1/1335* | (2006.01) | |
| *F21V 8/00* | (2006.01) | |
| *G02F 1/1333* | (2006.01) | |
| *G02F 1/1345* | (2006.01) | |

(52) U.S. Cl.
CPC ....... *G02F 1/133502* (2013.01); *G02B 6/005* (2013.01); *G02F 1/13338* (2013.01); *G02F 1/133616* (2021.01); *G02B 6/0083* (2013.01); *G02F 1/13452* (2013.01); *G02F 1/133528* (2013.01); *G02F 1/133553* (2013.01); *G02F 1/133562* (2021.01); *G02F 1/133567* (2021.01); *G02F 2203/02* (2013.01)

(58) Field of Classification Search
CPC ........... G02F 1/13338; G02F 1/133502; G02F 1/133616; G02F 1/133528
See application file for complete search history.

(56) References Cited

U.S. PATENT DOCUMENTS 9,811,188 B1 *   11/2017   Subbarayan ............ G02F 1/167
10,120,515 B1 *  11/2018   Ghali ................. G02F 1/133553
(Continued)

FOREIGN PATENT DOCUMENTS

CN          1272922 A      11/2000
CN        101099105 A       1/2008
(Continued)

OTHER PUBLICATIONS

European search report, European Application No. 21162678.3, dated Aug. 26, 2021 (7 pages).
(Continued)

*Primary Examiner* — Mariceli Santiago
(74) *Attorney, Agent, or Firm* — PV IP PC; Wei Te Chung; Ude Lu

(57) ABSTRACT

A display panel and a display device are provided. The display panel includes a display component layer and a first anti-reflective film arranged on the display component layer. The display component layer includes a first polarizer, a first substrate arranged on the first polarizer, a second substrate arranged on the first substrate and a second polarizer arranged on the second substrate. The anti-reflective film on the second polarizer may reduce reflected light energy while increasing transmitted light energy.

16 Claims, 3 Drawing Sheets

(56) References Cited

U.S. PATENT DOCUMENTS

| | | | |
|---|---|---|---|
| 2001/0004275 A1* | 6/2001 | Umemoto | G02F 1/133615 |
| | | | 349/65 |
| 2002/0145593 A1* | 10/2002 | Boyd | G06F 3/041 |
| | | | 345/173 |
| 2003/0076465 A1 | 4/2003 | Shimoda et al. | |
| 2003/0179563 A1 | 9/2003 | Masuda | |
| 2005/0088593 A1 | 4/2005 | Yamauchi | |
| 2005/0264719 A1* | 12/2005 | Sung | G02F 1/133536 |
| | | | 349/96 |
| 2014/0016043 A1* | 1/2014 | Chen | H04N 9/3197 |
| | | | 349/12 |
| 2014/0125602 A1 | 5/2014 | Chen | |

FOREIGN PATENT DOCUMENTS

| | | |
|---|---|---|
| CN | 202217253 U | 5/2012 |
| CN | 102736776 A | 10/2012 |
| CN | 105388668 A | 3/2016 |
| CN | 107045221 A | 8/2017 |
| CN | 206833398 U | 1/2018 |
| CN | 107991811 A | 5/2018 |
| CN | 111640370 A | 9/2020 |
| EP | 1209510 A1 | 5/2002 |

OTHER PUBLICATIONS

Chinese First office action, Chinese Application No. 202110180234.9, dated Mar. 10, 2022 (11 pages).

* cited by examiner

DISPLAY PANEL AND DISPLAY DEVICE

CROSS-REFERENCE TO RELATED APPLICATIONS

The present disclosure claims foreign priority of Chinese Patent Application No. 202110180234.9 and application name of "DISPLAY PANEL AND DISPLAY DEVICE", filed on Feb. 8, 2021 in the China National Intellectual Property Administration, the contents of all of which are hereby incorporated by reference.

TECHNICAL FIELD

The present disclosure generally relates to display technology, and in particular to a display panel and a display device.

BACKGROUND

In a Thin Film Transistor-Liquid Crystal Display (TFT-LCD), the thin film transistor acts as a switch. When the thin film transistor is powered, liquid crystal molecules are arranged in a regular pattern to allow light to pass easily. When the thin film transistor is not powered, the liquid crystal molecules are arranged randomly to prevent the light from passing. Technically speaking, a TFT-LCD panel is composed of two sophisticated sodium-free glass substrates and a liquid crystal layer therebetween. Light beam may be provided by a back-light module. When the light beam passes through the liquid crystal layer, the light beam may pass through or be blocked depending on whether the liquid crystal molecules are arranged regularly or irregularly. By adjusting orientation of the liquid crystal molecules on inner sides of substrates, an expected structural deformation of the liquid crystal molecules can be made, thus achieving different display modes. When a display mode is selected, the orientation of the liquid crystal molecules is changed under influence of electrical field. An intensity of incident light is changed under the liquid crystal layer along with a polarizer, and therefore image display is achieved.

Cellphones and tablets are typical electronic devices in our daily life. An electronic device is normally equipped with a display such as liquid crystal display (LCD), active-matrix organic light-emitting diode display (AMOLED) and so on. The LCD or AMOLED requires a backlight module or a self-luminous component to display light, and blue light emitted by the self-luminous component may be harmful to human eyes.

Fabricators of displays accordingly provide a kind of display which does not requires the backlight module and the self-luminous component, for example, a reflective liquid crystal display (RLCD). A traditional RLCD has high requirement of environment light intensity. Only when the traditional RLCD receives relatively high external environment light, the traditional RLCD can be used comfortably. When the environmental light intensity is relatively weak, brightness of the traditional RLCD is accordingly relatively low.

SUMMARY

Accordingly, the present disclosure aims to provide a display panel and a display device, which may improve the brightness of the display panel.

In a first aspect, a display panel is provided. The display panel includes: a display component layer comprising a first polarizer, a first substrate arranged on the first polarizer, a second substrate arranged on the first substrate, and a second polarizer arranged on the second substrate; and a first anti-reflective film arranged on the second polarizer.

In one embodiment, the display panel further includes: a light guide plate arranged on the first anti-reflective film; and a light emitting component arranged at a lateral side of the light guide plate.

In one embodiment, the display panel further includes: an optical adhesive layer arranged on the light guide plate; and a touch-control component arranged on the optical adhesive layer.

In one embodiment, the display panel further includes: a touch-control component arranged between the display component layer and the first anti-reflective film.

In one embodiment, the display panel further includes: a touch-control component arranged on the first anti-reflective film.

In one embodiment, the display panel further includes a second anti-reflective film arranged on the touch-control component.

In one embodiment, the touch-control component includes a sensor layer and a cover arranged on the sensor layer.

In one embodiment, the display panel further includes a light emitting component arranged at a lateral side of the first substrate.

In one embodiment, the display panel further includes a circuit board connected to a bottom surface of the light emitting component and a bottom surface of the light guide plate.

In another aspect, the present disclosure provides a display device. The display device includes a display component layer and a first anti-reflective film. The display component layer includes a first polarizer, a first substrate, a second substrate and a second polarizer successively stacked. The first anti-reflective film stacked on the second polarize.

In one embodiment, the display device further includes: a light guide plate arranged on the first anti-reflective film; and a light emitting component arranged at a lateral side of the light guide plate.

In one embodiment, the display device further includes: an optical adhesive layer arranged on the light guide plate; and a touch-control component arranged on the optical adhesive layer.

In one embodiment, the display device further includes: a touch-control component arranged between the display component layer and the first anti-reflective film.

In one embodiment, the display device further includes: a touch-control component arranged on the first anti-reflective film.

In one embodiment, the display device further includes a second anti-reflective film arranged on the touch-control component.

In one embodiment, the touch-control component includes a sensor layer and a cover arranged on the sensor layer.

In one embodiment, the display device further includes a light emitting component arranged at a lateral side of the first substrate.

In one embodiment, the display device further includes a circuit board connected to a bottom surface of the light emitting component and a bottom surface of the light guide plate.

In one embodiment, the display device further includes a flexible circuit board connected to a top surface of the first substrate.

In another aspect, the present disclosure provides a mobile terminal, the mobile terminal includes a display component layer, a first anti-reflective film and a touch-control component stacked with the first anti-reflective film. The display component layer includes a first polarizer, a first substrate, a second substrate and a second polarizer successively stacked. One of the first anti-reflective film and the touch-control component is stacked on the second polarizer

BRIEF DESCRIPTION OF THE DRAWINGS

In order to clearly explain the technical solutions and advantages in the embodiments of the present disclosure, the drawings used in the description of the embodiments will be briefly described below.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

In the specification, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" means two or more than two, unless specified otherwise.

In the description of the present disclosure, unless specified or limited otherwise, it should be noted that, a structure in which a first feature is "on" or "beneath" a second feature may include an embodiment in which the first feature directly contacts the second feature, and may also include an embodiment in which an additional feature is formed between the first feature and the second feature so that the first feature does not directly contact the second feature. Furthermore, a first feature "on", "above", or "on top of" a second feature may include an embodiment in which the first feature is right "on", "above", or "on top of" the second feature, and may also include an embodiment in which the first feature is not right "on", "above", or "on top of" the second feature, or just means that the first feature has a sea level elevation greater than the sea level elevation of the second feature. While first feature "beneath", "below", or "on bottom of" a second feature may include an embodiment in which the first feature is right "beneath", "below", or "on bottom of" the second feature, and may also include an embodiment in which the first feature is not right "beneath", "below", or "on bottom of" the second feature, or just means that the first feature has a sea level elevation less than the sea level elevation of the second feature.

Figure 1:
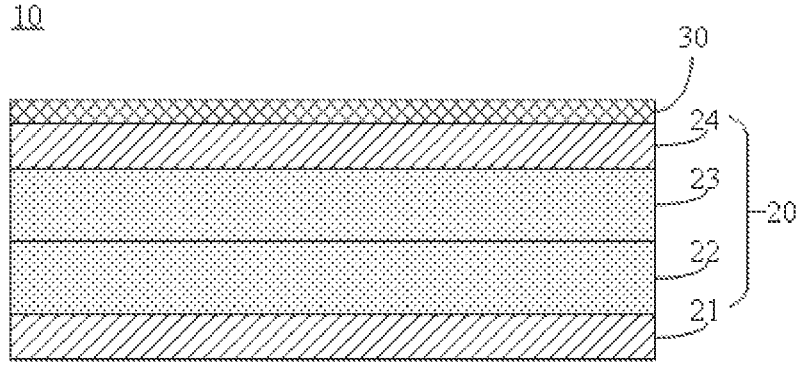
FIG. 1 is a schematic diagram of a display panel according to a first embodiment of the present disclosure.

FIG. 1 is a schematic diagram of a display panel according to a first embodiment of the present disclosure. The display panel may include a display component layer 20 and a first anti-reflective film 30 arranged on the display component layer 20. The display component layer 20, from bottom to top, may include a first polarizer 21, a first substrate 22 arranged on the first polarizer 21, a second substrate 23 arranged on the first substrate 22 and a second polarizer arranged on the second substrate 23. In some embodiments, the first substrate 22 may be a thin film transistor (TFT) array substrate, the second substrate 23 may be a color film (CF) substrate. A liquid crystal layer and other structures for achieving display function may be arranged between the first substrate 22 and the second substrate 23.

Reflection occurring on a surface of an optical instrument may affect transmitted light energy, and reflected light may form stray light. The stray light may influence image quality of the optical instrument. In order to solve this problem, a single layer film or multi-layer film is usually coated on the surface of the optical instrument to reduce reflected light on the component. The single layer film or multi-layer film is known as anti-reflective film or anti-reflective coating. Principle of optical anti reflection is analyzed from the law of energy conservation. Generally, when light arrives at a surface of an optical component made of a given material, the total amount of reflected light energy and transmitted light energy is determined. Without considering absorption, scattering and other factors, the total of reflected light energy and transmitted light energy is always equal to incident light energy, which meets the law of conservation of energy. When the surface of the optical component is coated by a film, the relation of the reflected light energy, the transmitted light energy and the incident light energy still follows the law of conservation of energy without considering the absorption and scattering of the film and other factors. The film may be configured to redistribute reflected light energy and transmitted light energy. The anti-reflective film may reduce reflected light energy and increase the transmitted light energy. In a word, the anti-reflective film may redistribute the reflected light energy and the transmitted light energy on the surface of the optical component. A result of redistribution is that the transmitted light energy increases while the reflected light energy decreases.

In the embodiment of the present disclosure, the first anti-reflective film 30 may be made from magnesium fluoride or other suitable high polymer compound. The first anti-reflective film 30 is called AR film. Optical path lengths of reflected lights on a top surface and a bottom surface of the first anti-reflective film 30 have a half wavelength difference. That is, optical path length of reflected lights on the top surface and optical path length of reflected lights on the bottom surface of the first anti-reflective film 30 have a half wavelength difference. Thus, reflected light on the two surfaces of the first anti-reflective film 30 may interfere destructively, that is, the the reflected light energy decreases and the transmitted light energy increases to make energy of the transmitted light arriving at the display component layer 20 increased and brightness of product interface improved. In the present embodiment, a thickness of the first anti-reflective film 30 is equal to a quarter of wavelength of light in the first anti-reflective light 30 to make reflected light on the top and bottom surface of the first anti-reflective film 30 interfere destructively.

Coating methods of the anti-reflective film may includes vacuum evaporation method, chemical vapor deposition method, sol-gel coating method etc. Compared to the other two methods, equipment of sol-gel coating is simple. The sol-gel coating method can be operated under normal temperature and pressure. Uniformity of coting is relatively high, microstructure is controllable. The sol-gel coating method can be adopted to substrates of different shapes and dimensions. Process of the sol-gel coating method may be controlled to obtain optical films with high laser damage threshold. Thus, the sol-gel coating method has become a most competitive fabrication method of high power laser films.

In the present embodiment, the display component layer 20, as a reflective liquid crystal display (RLCD) screen, may further include a reflection layer (not shown) coated on the surface of the first substrate 22. The reflection layer may be made of polyethylene terephthalate (PET) or polycarbonate (PC). Reflection rate of the reflection layer may reach 90%. Light from a light-emitting component and external environment may be reflected by the reflection layer and enter user's eyes so as to emit light. Since transmitted light arriving at the display component layer 20 is increased, transmitted light arriving at the reflection layer and reflected to the user's eyes is accordingly increased. Thus, the brightness of the display panel may be improved.

Figure 2:
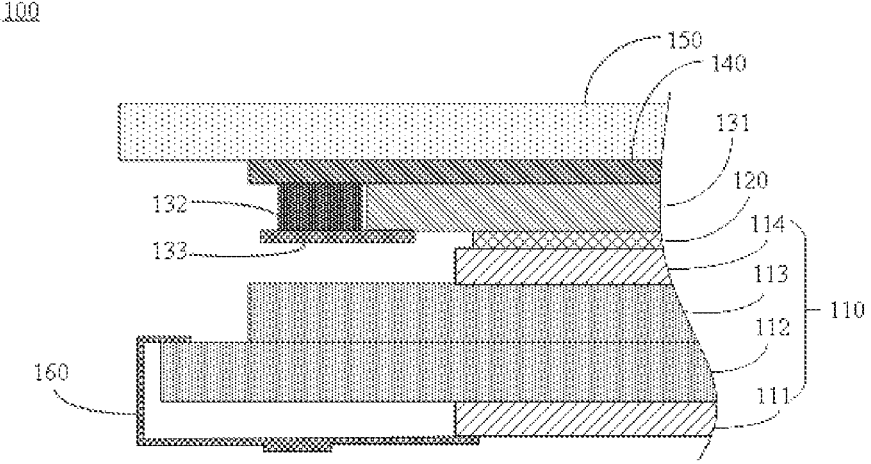
FIG. 2 is a schematic diagram of a display panel according to a second embodiment of the present disclosure in which a light emitting component is arranged at a lateral side of a light guide plate.
Figure 2A:
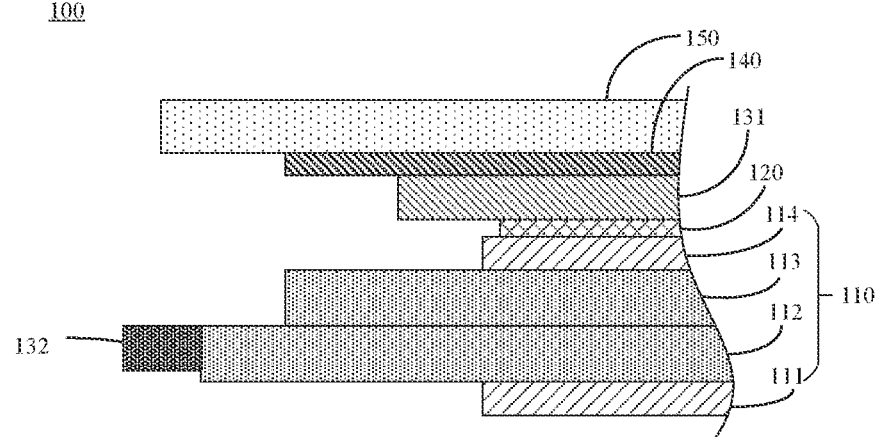
FIG. 2a is a case where the light emitting component is arranged at a lateral side of a first substrate.

FIG. 2 shows a schematic diagram of a display panel according to a second embodiment of the present disclosure. The display panel 100 may include a display component layer 110, a first anti-reflective film 120 arranged on the display component layer 110, a light guide plate 131 arranged on the first anti-reflective film 120, and a light-emitting component 132 arranged at a lateral side of the light guide plate 131. The light-emitting component 132 may be an LED lamp or other type of light source. In some embodiments, the display component layer 110 may include a first polarizer 111, a first substrate 112 arranged on the first polarizer 111, a second substrate 113 arranged on the first substrate 112, and a second polarizer arranged on the second substrate 113.

In this embodiment, the display component layer 110, as a RLCD screen, may further include a reflection layer (not shown) coated on the surface of the first substrate 112. The reflection layer may be made of polyethylene terephthalate (PET) or polycarbonate (PC). Reflection rate of the reflection layer may reach 90%. Light from a light-emitting component and external environment may be reflected by the reflection layer and enter user's eyes so as to emit light. Since transmitted light arriving at the display component layer 110 is increased, transmitted light reflected by the reflection layer to the user's eyes is accordingly increased. Thus, the brightness of the display panel may be improved.

It should be noted, in order to demonstrate the light-emitting component and the circuit board, FIG. 2 merely shows a structure of non-display region. Display region may be arranged on a right side of the non-display region shown in the figure. The display panel 100 may further include a circuit board 133 connected to a bottom surface of the light-emitting component 132 and a bottom surface of the light guide plate 131. The bottom surface of the light guide plate 131 and the bottom surface of the light-emitting component 132 may be attached to the circuit board 133 by double-sided adhesive. The display panel 100 may further include a flexible circuit board 160 connected (e.g., welded) to a top surface of the first substrate 112 configured to control of display functions. The flexible circuit board 160 may be bent to a bottom surface of the first substrate 112 and connected to the first polarizer 111. In other embodiments, the flexile circuit board 160 may not be connected to the first polarizer, but may be connected to a middle frame (not shown). In some embodiments, the flexible circuit board 1600 may be provided with some electronic components such as capacitances and resistances.

In some embodiments, the light-emitting component 132 may be arranged on a lateral side of the first substrate 112, which is not limited in the present embodiment. The display panel 100 provided in the present embodiment may be applied not only in the RLCD screen, but also in other type of display screen with front light-emitting component configuration.

In the present embodiment, the display panel 100 may further include an optical adhesive layer 140 arranged on the light guide plate 131 and a touch-control component 150 arranged on the optical adhesive layer 140. The optical adhesive layer 140 may be solid or liquid. The touch-control component 150 may include a sensor layer and a cover arranged on the sensor layer. The sensor layer and the cover may be made of, for example but not limited to, $SiO_2$, PC, or polymethyl methacrylate (PMMA). The sensor layer and the cover may be made of either same or different material. For example, the touch-control component 150 may include a glass cover with a glass sensor layer, a glass cover with a thin-film sensor layer, a soft cover with a glass sensor layer, or a glass cover with a double thin-film sensor layer.

In the present embodiment, the first anti-reflective film 120 is arranged between the second polarizer 114 and the light guide plate 120. The first anti-reflective film 120 of the present embodiment may have a similar function as the first anti-reflective film 30 shown in the first embodiment, and may serve to increase transmitted light energy (i.e., transmitted light passes through the second polarizer 114) and increase the brightness of the display panel. Besides, the first anti-reflective film 120 is arranged beneath the light guide plate 120, and most part of light guided by the light guide plate 120 may pass and reach the display component layer 110, which provides a high light use efficiency.

Figure 3:
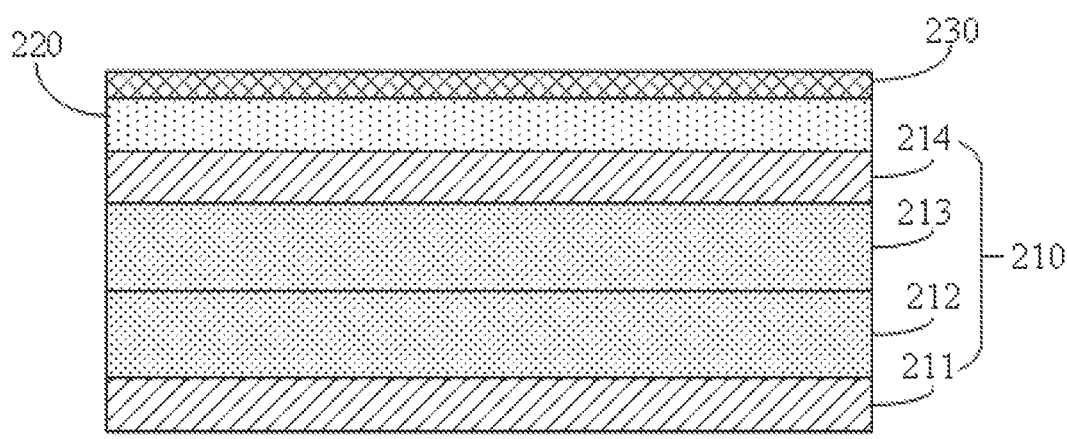
FIG. 3 is a schematic diagram of a display panel according to a third embodiment of the present disclosure.

FIG. 3 shows a schematic diagram of a display panel according to a third embodiment of the present disclosure. The display panel 200 may include a display component layer 210, a touch-control component 220, and a first anti-reflective film 230 arranged on the touch-control component 220. In this embodiment, reflected light at top and bottom surfaces of the first anti-reflective film 230 interferes destructively to make energy of light passing through the touch-control component 220 increased. Thus, the brightness of the display panel may be improved.

In some embodiments, the display component layer 210 may include a first polarizer 211, a first substrate 212 arranged on the first polarizer 211, a second substrate 213 arranged on the first substrate 212, and a second polarizer 214 arranged on the second substrate 213. The touch-control component 220 may include a sensor layer and a cover arranged on the sensor layer. The sensor layer and the cover may be made of, for example but not limited to, $SiO_2$, PC, or polymethyl methacrylate (PMMA). The sensor layer and the cover may be made of either same or different material. For example, the touch-control component 220 may include a glass cover with a glass sensor layer, a glass cover with a thin-film sensor layer, a soft cover with a glass sensor layer, or a glass cover with a double thin-film sensor layer.

In this embodiment, the display component layer 210, as a RLCD screen, may further include a reflection layer (not shown) coated on the surface of the first substrate 212. The reflection layer may be made of polyethylene terephthalate (PET) or polycarbonate (PC). Reflection rate of the reflection layer may reach 90%. Light from a light-emitting component and external environment may be reflected by the reflection layer and enter user's eyes so as to emit light. Since transmitted light is increased, transmitted light reflected by the reflection layer to the user's eyes is accordingly increased. Thus, the brightness of the display panel may be improved. The display panel 200 provided in the present embodiment may be applied not only in the RLCD screen, but also in other type of display screen with front light-emitting component configuration.

Figure 4:
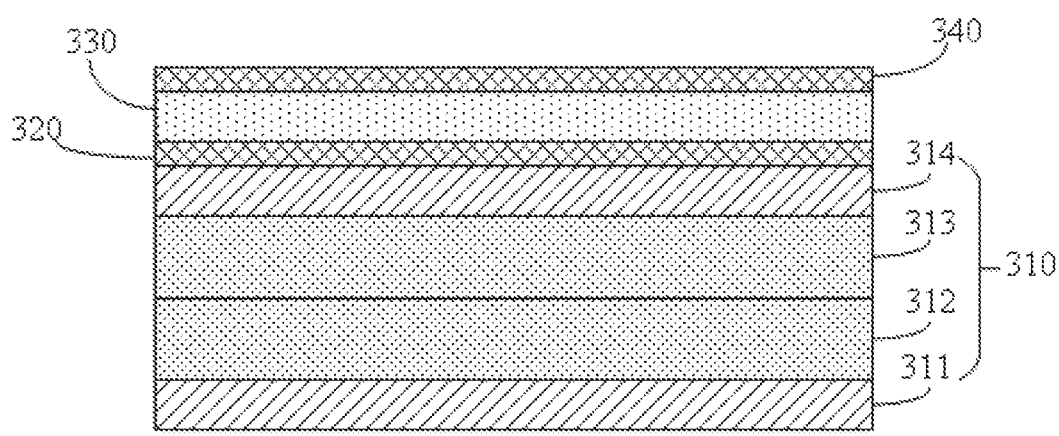
FIG. 4 is a schematic diagram of a display panel according to a fourth embodiment of the present disclosure.

FIG. 4 shows a schematic diagram of a display panel according to a fourth embodiment of the present disclosure. The display panel 300 may include a display component layer 310 and a first anti-reflective film 320 arranged on the display component layer 310. The display panel 300 may further include a touch-control component 330 arranged on the first anti-reflective film 320 and a second anti-reflective film 340 arranged on the touch-control component 330.

In some embodiments, the display component layer 310 may include a first polarizer 311, a first substrate 312 arranged on the first polarizer 311, a second substrate 313 arranged on the first substrate 312, and a second polarizer 314 arranged on the second substrate 313. The touch-control component 320 may include a sensor layer and a cover arranged on the sensor layer. The sensor layer and the cover may be made of, for example but not limited to, $SiO_2$, PC, or polymethyl methacrylate (PMMA). The sensor layer and the cover may be made of either same or different material. For example, the touch-control component 320 may include a glass cover with a glass sensor layer, a glass cover with a thin-film sensor layer, a soft cover with a glass sensor layer, or a glass cover with a double thin-film sensor layer.

In this embodiment, the display component layer 310, as a RLCD screen, may further include a reflection layer (not shown) coated on the surface of the first substrate 312. The reflection layer may be made of polyethylene terephthalate (PET) or polycarbonate (PC). Reflection rate of the reflection layer may reach 90%. Light from a light-emitting component and external environment may be reflected by the reflection layer and enter user's eyes so as to emit light. Since transmitted light is increased, transmitted light reflected by the reflection layer to the user's eyes is accordingly increased. Thus, the brightness of the display panel may be improved. The display panel 200 provided in the present embodiment may be adopted not only in the RLCD screen, but also in other type of display screen with front light-emitting component configuration.

Optical path lengths of reflected lights on a top surface and a bottom surface of the first anti-reflective film 320 have a half wavelength difference, that is, optical path length of reflected lights on the top surface and optical path length of reflected lights on the bottom surface of the first anti-reflective film 320 have a half wavelength difference. Thus, reflected light on the two surfaces of the first anti-reflective film 320 may interfere destructively, that is, the reflected light energy decreases and the transmitted light energy increases to make energy of the transmitted light arriving at the display component layer 310 increased and brightness of product interface improved. In the present embodiment, a thickness of the first anti-reflective film 320 is equal to a quarter of wavelength of light in the first anti-reflective light 320 to make reflected light on the top and bottom surface of the first anti-reflective film 320 interfere destructively.

Optical path lengths of reflected lights on a top surface and a bottom surface of the second anti-reflective film 340 have a half wavelength difference, that is, optical path length of reflected lights on the top surface and optical path length of reflected lights on the bottom surface of the second anti-reflective film 340 have a half wavelength difference. Thus, reflected light on the two surfaces of the first anti-reflective film 320 may interfere destructively, that is, the transmitted light energy increases and energy of transmitted light passing through the touch module 330 increases to make brightness of product interface improved. Therefore, the second anti-reflective film 340 may increase energy of transmitted light passing through the touch-control component 330 and improve the brightness of the product interface. In the present embodiment, a thickness of the second anti-reflective film 340 is equal to a quarter of wavelength of light in the second anti-reflective light 340 to make reflected light on the top and bottom surface of the second anti-reflective film 340 interfere destructively.

The display panel 300 includes two anti-reflective films (the first anti-reflective film 320 and the second anti-reflective film 340). The first anti-reflective film 320 is arranged between the second polarizer 314 and the touch-control component 330, and may increase transmitted light energy on the top surface of the second polarizer 314. The second anti-reflective film 340 is arranged on the touch-control component 330, and may increase transmitted light energy on the top surface of the touch-control component 330. The two-level anti-reflective structure may further increase the energy of transmitted light passing downward the display panel 300 and further improve the brightness of the display panel.

In the present embodiment, a light guide plate and a light-emitting component at a lateral side of the light guide plate may be arranged between the first anti-reflective film 320 and the touch-control component 330. The light-emitting component may be an LED lamp. The display panel 300 may also include a circuit board connected to the light-emitting component and the light guide plate. Specifically, a bottom surface of the light guide plate and a bottom surface of the light-emitting component may be attached to a circuit board by double-sided adhesive. The circuit board may be configured to control light emitting. The display panel 300 may further include a flexible circuit board connected to a top surface of the first substrate 312. The flexible circuit board may be connected to the first substrate 312 by welding. The flexible circuit board may achieve display function through controlling the TFTs on the first substrate 312.

A display device is further provided by the embodiments of the present disclosure. The display device may include any one of the above-mentioned display panels. It should be understood, technical effects of the display device may be similar as technical effects of the above-mentioned display panels, which will not be repeated herein.

In some embodiments, display device may includes a display component layer and a first anti-reflective film. The display component layer may includes a first polarizer, a first substrate, a second substrate and a second polarizer successively stacked. The first anti-reflective film stacked on the second polarize.

Figure 5:
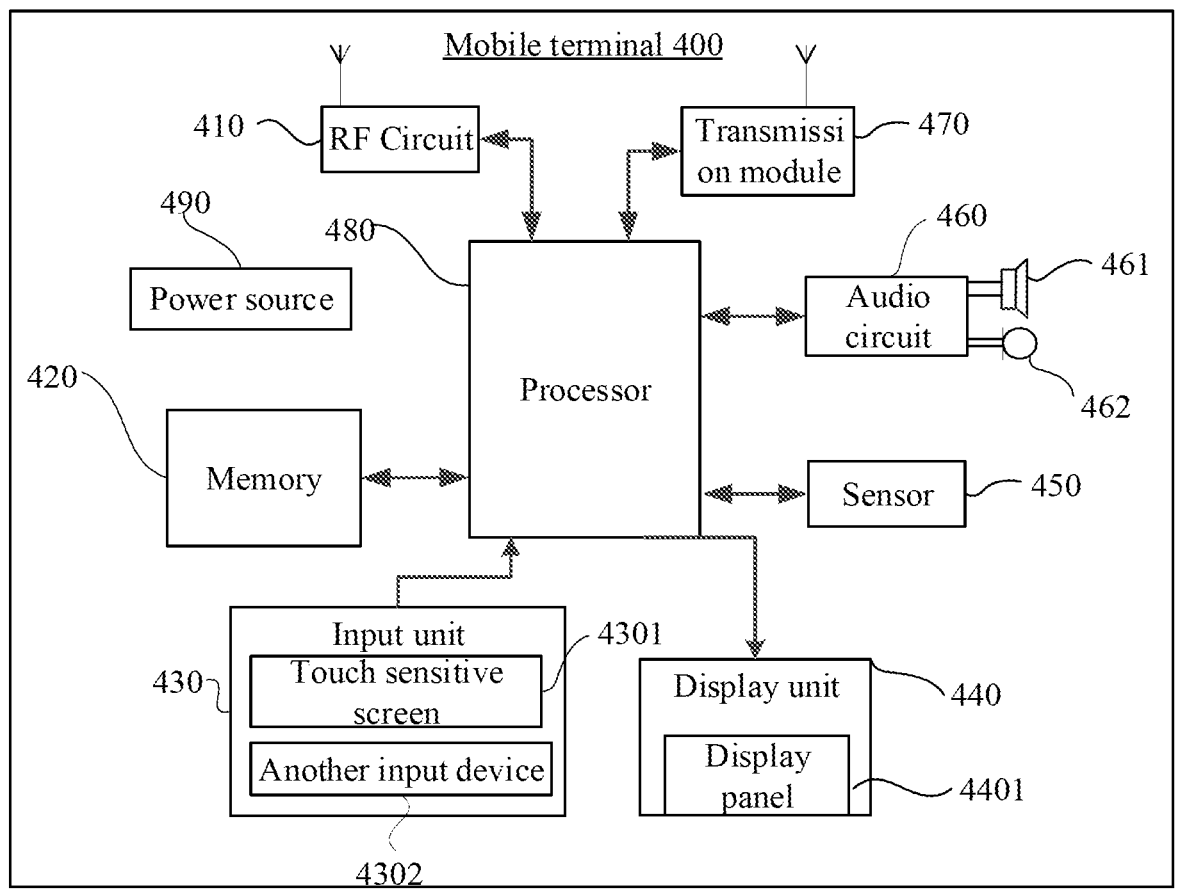
FIG. 5 is a schematic diagram of a mobile terminal according to an embodiment of the present disclosure.

The display panel provided by embodiments of the present disclosure may be applied in a mobile terminal. The mobile terminal may be a cellphone, computer etc. Referring to FIG. 5, FIG. 5 is a schematic diagram of a mobile terminal according to an embodiment of the present disclosure. The mobile terminal 400 may include a radio frequency (RF) circuit 410, a memory 420, an input unit 430, a display unit 440, a sensor 450, an audio circuit 460, a transmission module 470, a processor 480, a power source 490 and so on.

The RF circuit 410 is configured to receive and transmit electromagnetic waves, and convert electromagnetic waves and electrical signals to communicate with a communication network or other device. The RF circuit 410 can include various existing circuit components for performing these functions, such as an antenna, a radio frequency transceiver, a digital signal processor, an encryption/decryption chip, a subscriber identity module (SIM) card, a memory, and the like. The RF circuit 410 can communicate with various networks such as the Internet, an intranet, a wireless network, or communicate with other devices over a wireless network. The wireless network described above may include a cellular telephone network, a wireless local area network, or a metropolitan area network. The above wireless network can use various communication standards, protocols and technologies, including but not limited to global system for mobile communication (GSMC), enhanced data GSM environment (EDGE), wideband code division multiple access (W-CDMA), code division access (CDMA), time division multiple access (TDMA), wireless fidelity (Wi-Fi) (such as the institute of electrical and electronics engineers standards IEEE 802.10A, IEEE 802.11b, IEEE 802.11g and/or IEEE 802.11n), voice over internet protocol (VoIP), worldwide interoperability for microwave access, (Wi-Max), other protocols for mail, instant messaging and short messages, and any other suitable communication protocols, even those that are not currently being developed.

The memory 420 may be configured to store software programs and data, the software programs stored in the memory 420 may include executable codes or instructions. The processor 480 runs the software program and module stored in the memory 420, to implement various functional applications and data processing. The memory 420 may mainly include a program storage area and a data storage area, where the program storage area may store an operating system, an application program required by at least one function (such as a voice play function, and an image play function), and the like, and the data storage area may store data (such as audio data, and an address book) that is created according to use of the mobile terminal, and the like. In addition, the memory 420 may include a high speed random access memory, or may also include a non-volatile memory, such as at least one magnetic disk storage device, a flash memory, or another volatile solid-state storage device. Accordingly, the memory 420 may further include a memory controller, so that the processor 480 and the input unit 430 may access the memory 420.

The input unit 430 may be configured to receive input digit or character information, and generate keyboard, mouse, joystick, optical, or track ball signal input related to the user setting and function control. Specifically, the input unit 430 may include a touch-sensitive screen 4301 and another input device 4302. The touch-sensitive surface 4301 may also be referred to as a touch screen or a touch panel, and may collect a touch operation of a user on or near the touch-sensitive surface (such as an operation of a user on or near the touch-sensitive screen 4301 by using any suitable object or attachment, such as a finger or a touch pen), and drive a corresponding connection apparatus according to a preset program. Optionally, the touch-sensitive screen 4301 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 480. Moreover, the touch controller can receive and execute a command sent by the processor 480. In addition, the touch-sensitive screen 4301 may be implemented by using various types, such as a resistive type, a capacitance type, an infrared type, and a surface acoustic wave type. In addition to the touch-sensitive screen 4301, the input unit 130 may further include another input device 4302. Specifically, the another input device 4302 may include, but is not limited to, one or more of a physical keyboard, a functional key (such as a volume control key or a switch key), a track ball, a mouse, and a joystick.

The display unit 440 may be configured to display information input by the user or information provided for the user, and various graphical user interfaces of the mobile terminal 400. The graphical user interfaces may be formed by a graph, a text, an icon, a video, and any combination thereof. The display unit 440 may include a display panel 4401. In some embodiments, the touch sensitive screen 4301 and the display panel 4401 work as two separated components to achieve input and output functions. In other embodiments, the touch sensitive screen 4301 and the display panel 4401 may be integrated to achieve input and output function.

The mobile terminal 400 may further include at least one sensor 450, such as an optical sensor, a motion sensor, and other sensors. Specifically, the optical sensor may include an ambient light sensor and a proximity sensor. The ambient light sensor may adjust luminance of the display panel 4401 according to brightness of the ambient light. The proximity sensor may switch off the display panel 4401 and/or backlight when the mobile terminal 400 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock). Other sensors, such as a gyroscope, a barometer, a hygrometer, a thermometer, and an infrared sensor, which may be configured in the mobile terminal 400 are not further described herein.

The audio circuit 460, a loudspeaker 461, and a microphone 462 may provide audio interfaces between the user and the mobile terminal 400. The audio circuit 460 may convert received audio data into an electric signal and transmit the electric signal to the loudspeaker 461. The loudspeaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to, for example, another mobile terminal by using the RF circuit 410, or outputs the audio data to the memory 420 for further processing. The audio circuit 460 may further include an earplug jack, so as to provide communication between a peripheral earphone and the mobile terminal 400.

The mobile terminal 400 may help the user to receive and send e-mails, browse websites and access stream media through the transmission module 470 (e.g., Wi-Fi module). It can provides wireless broadband internet access function to the user.

The processor 480 is a control center of the mobile terminal, and connects to various parts of the mobile terminal 400 by using various interfaces and lines. By running or executing the software program and/or module stored in the memory 420, and invoking data stored in the memory 420, the processor 480 performs various functions and data processing of the mobile terminal, thereby performing overall monitoring on the mobile phone. Optionally, the processor 480 may include one or more processing cores. In some embodiments, the processor 480 may integrate an application processor and a modem, where the application processor mainly processes an operating system, a user interface, and an application program and the like, and the modem mainly processes wireless communication. It may be understood that, the foregoing modem may also not be integrated into the processor 480.

The mobile terminal 400 further includes a power source 490 (such as a battery) for supplying power to the components. In some embodiments, the power source may logically connect to the processor 480 by using a power source management system, thereby implementing functions, such as charging, discharging, and power consumption management by using the power source management system. The power source 490 may further include other components, such as one or more direct current or alternate current power supplies, a re-charging system, a power source fault detection circuit, a power source converter or an inverter, and a power source state indicator. Although not shown, the mobile terminal 400 may further include a camera (e.g., front camera or rear camera), a Bluetooth module and the like, which is not described herein.

In some embodiment, the mobile terminal includes a display component layer, a first anti-reflective film and a touch-control component stacked with the first anti-reflective film. The display component layer may includes a first polarizer, a first substrate, a second substrate and a second polarizer successively stacked. One of the first anti-reflective film and the touch-control component is stacked on the second polarizer.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A display panel, comprising:
    a display component layer, comprising:
       a first polarizer;
       a first substrate arranged on the first polarizer;
       a second substrate arranged on the first substrate; and
       a second polarizer arranged on the second substrate;
    a first anti-reflective film arranged on the second polarizer;
    a touch-control component arranged on the first anti-reflective film; and
    a second anti-reflective film arranged on the touch-control component away from the first anti-reflective film.

2. The display panel of claim 1, further comprising:
    a light guide plate provided between the touch-control component and the first anti-reflective film, wherein the light guide plate is arranged on the first anti-reflective film; and
    a light emitting component arranged at a lateral side of the light guide plate.

3. The display panel of claim 2, further comprising:
    an optical adhesive layer arranged on the light guide plate, wherein the touch-control component is arranged on the optical adhesive layer.

4. The display panel of claim 2, further comprising:
    a circuit board connected to a bottom surface of the light guide plate and a bottom surface of the light emitting component.

5. The display panel of claim 1, wherein
    the touch-control component comprises a sensor layer and a cover arranged on the sensor layer.

6. The display panel of claim 1, further comprising:
    a light emitting component arranged at a lateral side of the first substrate.

7. The display panel of claim 1, wherein a thickness of the first anti-reflective film is equal to a quarter of wavelength of light in the first anti-reflective film; and a thickness of the second anti-reflective film is equal to a quarter of wavelength of light in the second anti-reflective film.

8. A display device, comprising:
    a display component layer, comprising a first polarizer, a first substrate, a second substrate and a second polarizer successively stacked;
    a first anti-reflective film stacked on the second polarize;
    a touch-control component arranged on the first anti-reflective film; and
    a second anti-reflective film arranged on the touch-control component away from the first anti-reflective film.

9. The display device of claim 8, further comprising:
    a light guide plate provided between the touch-control component and the first anti-reflective film, wherein the light guide plate is arranged on the first anti-reflective film; and
    a light emitting component arranged at a lateral side of the light guide plate.

10. The display device of claim 9, further comprising:
    an optical adhesive layer arranged on the light guide plate; wherein the touch-control component is arranged on the optical adhesive layer.

11. The display device of claim 9, further comprising:
    a circuit board connected to a bottom surface of the light guide plate and a bottom surface of the light emitting component.

12. The display device of claim 8, wherein
    the touch-control component comprises a sensor layer and a cover arranged on the sensor layer.

13. The display device of claim 8, further comprising:
    a flexible circuit board connected to a top surface of the first substrate.

14. The display device of claim 8, wherein a thickness of the first anti-reflective film is equal to a quarter of wavelength of light in the first anti-reflective film; and a thickness of the second anti-reflective film is equal to a quarter of wavelength of light in the second anti-reflective film.

15. A mobile terminal, comprising:
    a display component layer, comprising a first polarizer, a first substrate, a second substrate and a second polarizer successively stacked;
    a first anti-reflective film stacked on the second polarizer;
    a touch-control component stacked with the first anti-reflective film; and a second anti-reflective film arranged on the touch-control component away from the first anti-reflective film.

16. The mobile terminal of claim 15, wherein a thickness of the first anti-reflective film is equal to a quarter of wavelength of light in the first anti-reflective film; and a thickness of the second anti-reflective film is equal to a quarter of wavelength of light in the second anti-reflective film.

\* \* \* \* \*